Oct. 25, 1932.     H. B. HULL     1,883,920
REFRIGERATING APPARATUS
Filed April 13, 1927     8 Sheets-Sheet 1

Inventor
Harry B. Hull
By Spencer, Hardman, and Fehr
his Attorneys

Oct. 25, 1932.　　　　H. B. HULL　　　　1,883,920
REFRIGERATING APPARATUS
Filed April 13, 1927　　8 Sheets-Sheet 2

Inventor
Harry B. Hull
By Spencer, Hardman, and Fisher
his Attorneys.

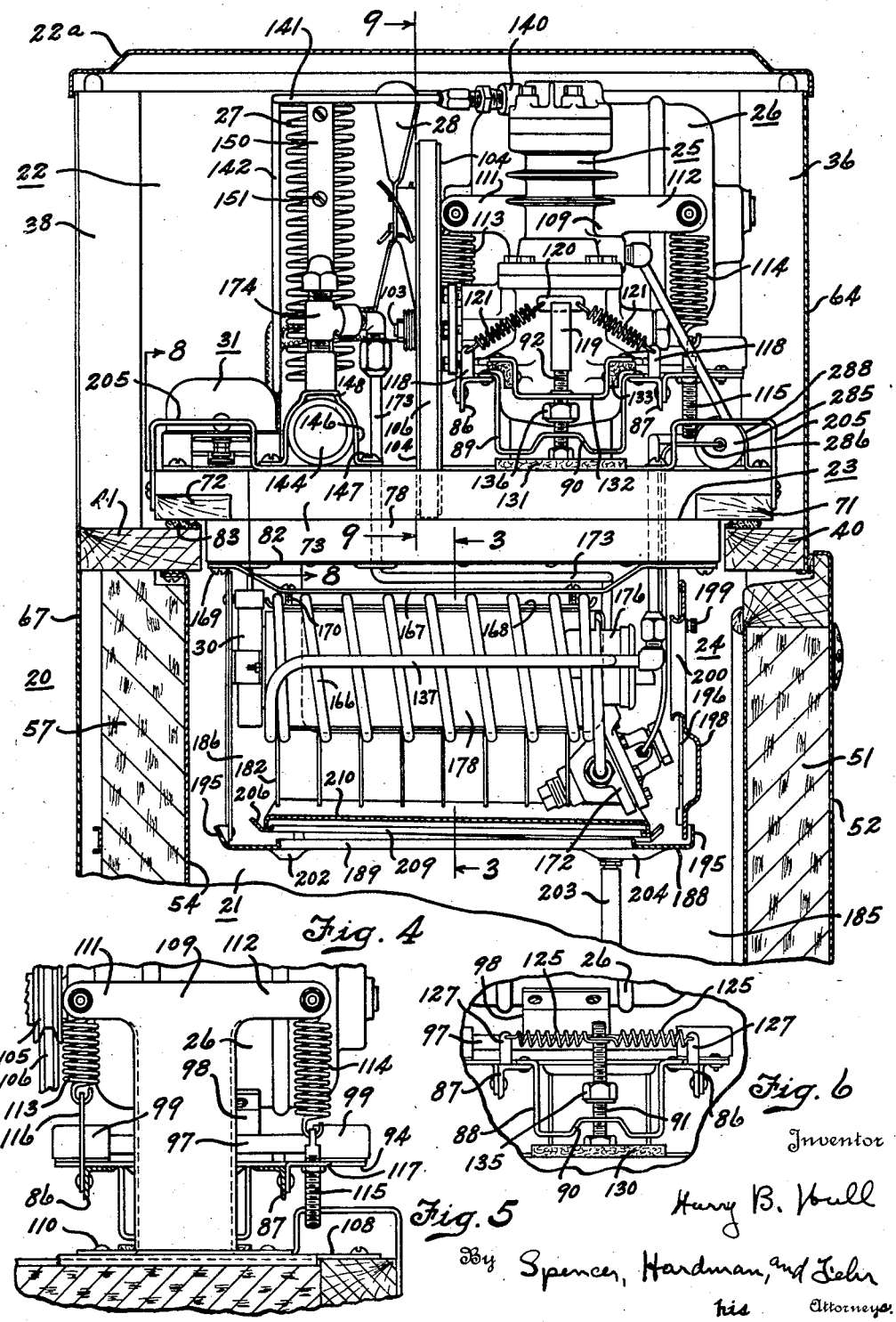

Oct. 25, 1932.    H. B. HULL    1,883,920
REFRIGERATING APPARATUS
Filed April 13, 1927    8 Sheets-Sheet 4

Inventor
Harry B. Hull
By Spencer, Hardman, and Fehr
his Attorneys.

Oct. 25, 1932.  H. B. HULL  1,883,920
REFRIGERATING APPARATUS
Filed April 13, 1927  8 Sheets-Sheet 6

Inventor
Harry B. Hull
By Spencer, Hardman, and Fehr
his Attorneys

Oct. 25, 1932.  H. B. HULL  1,883,920
REFRIGERATING APPARATUS
Filed April 13, 1927    8 Sheets-Sheet 7

Inventor
Harry B. Hull
By Spencer, Hardman, and Fisher
his Attorneys.

Oct. 25, 1932.    H. B. HULL    1,883,920
REFRIGERATING APPARATUS
Filed April 13, 1927    8 Sheets-Sheet 8

Inventor
Harry B. Hull

By Spencer, Hardman, and Fisher
his Attorneys.

Patented Oct. 25, 1932

1,883,920

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed April 13, 1927. Serial No. 183,480.

The present invention relates to refrigerators and more particularly to the type of refrigerators having a cooling unit located within a refrigerator cabinet and connected with refrigerant circulating apparatus.

One of the objects of the present invention is to provide for the construction of the refrigerator as two major subassembly, namely: a cabinet and the refrigerating apparatus, the apparatus being adapted to be attached to the finished cabinet as an assembly. The aapparatus assembly also includes a wall which, when the apparatus is assembled with the cabinet, provides a partition for dividing the cabinet into a food compartment and a cooling compartment. This partition wall is also arranged to provide a base for the apparatus upon which the apparatus may rest when it is not assembled with the cabinet.

Another object of the present invention is to provide for the quick freezing or congealing of water or other substances while maintaining the storage or food compartment at a desired temperature. One manner of carrying out this object is to utilize a portion of the unit for cooling circulating air and an other portion for freezing and congealing and to insulate and isolate this latter portion from the circulating air.

A further object of the invention is to prevent air which has been heated by the condenser, from entering the food compartment when the door of said compartment is open. This object is carried out by directing the warm air away from the front or door side of the refrigerator.

A still further object is to increase the efficiency of the refrigerating system, particularly when the refrigerator is subject to a relatively warm environment and to provide means for automatically governing the system to function desirably throughout changing environment temperatures while insuring quick freezing at all times.

Another object is to reduce the cost of manufacture and facilitate the construction of the condenser and receiver utilized in the refrigerating system.

Further objects and advantages of the present invention will be apparent from the following description, reference being had to the accompanying drawings, wherein a preferred form of the present invention is clearly shown.

In the drawings:

Fig. 4 is a side view of the refrigerating apparatus looking in the direction of arrow 4 in Fig. 3, and a sectional view of the upper part of the cabinet, the section being taken on line 4—4 of Fig. 3.

Fig. 5 is a fragmentary sectional view taken on line 5—5 of Fig. 3.

Fig. 6 is a fragmentary view looking in the direction of arrow 6 of Fig. 3.

Figure 2:
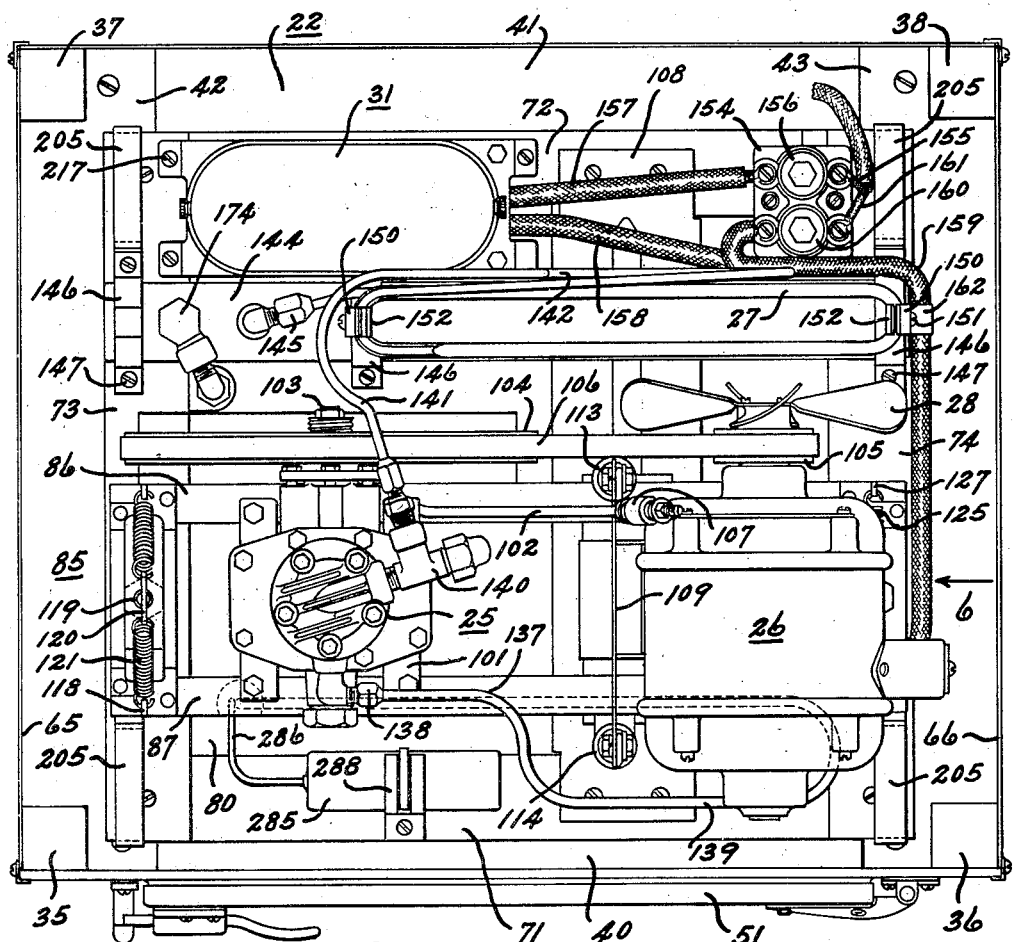
Fig. 2 is a top plan view of a refrigerator showing the top cover removed.
Figure 1:
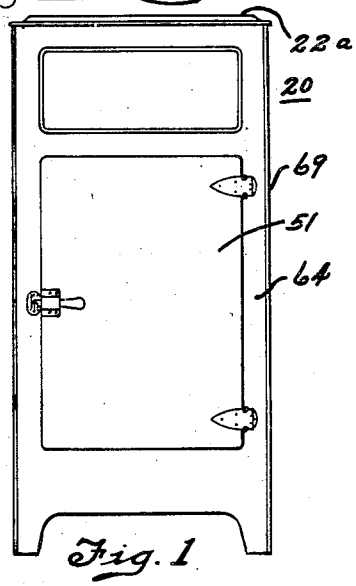
Fig. 1 is a front view of the improved refrigerator.
Figure 3:
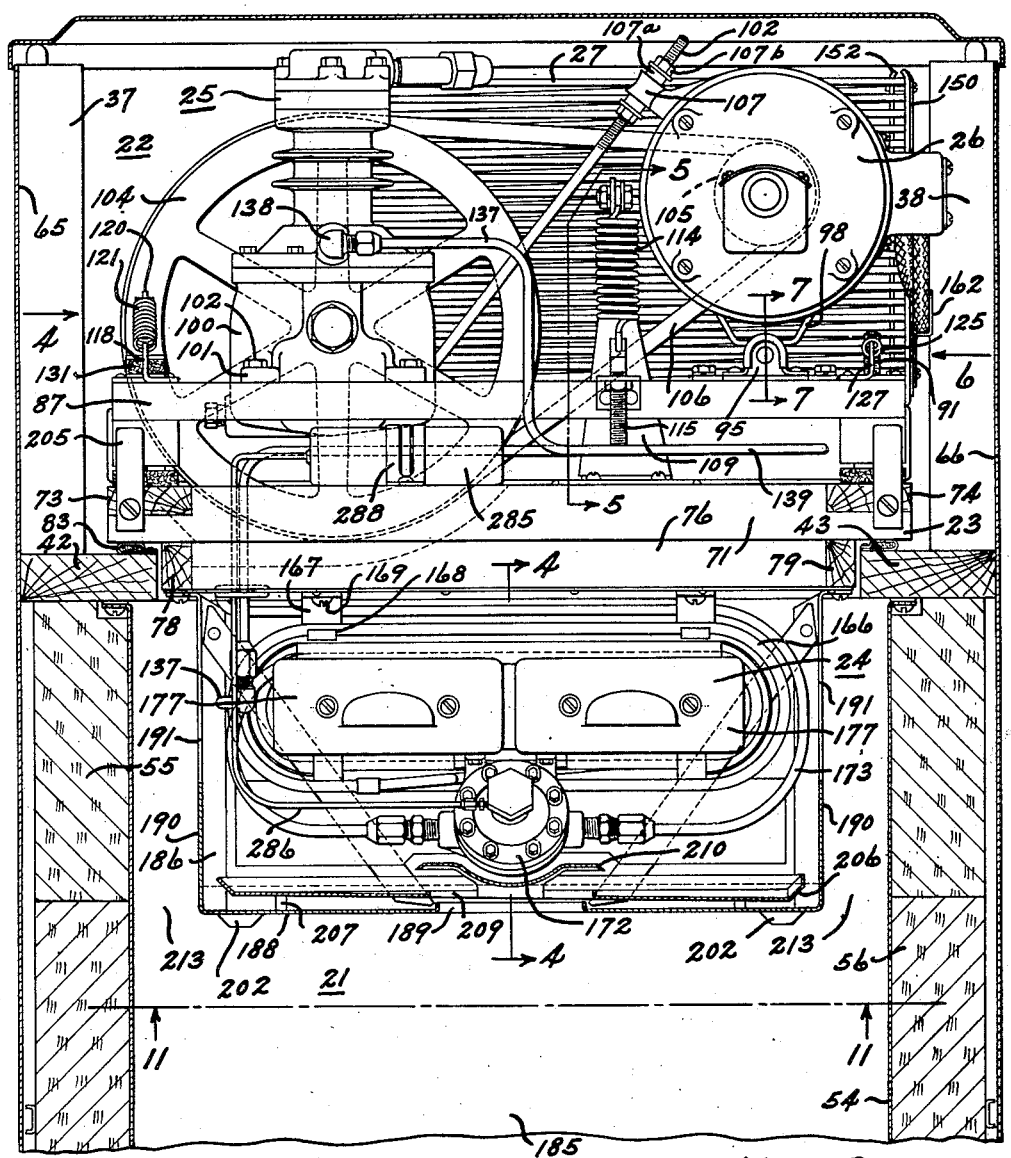
Fig. 3 is a front view of the refrigerating apparatus together with a longitudinal sectional view of the upper part of the refrigerator cabinet, the section being taken on line 3—3 of Fig. 4.
Figure 7:
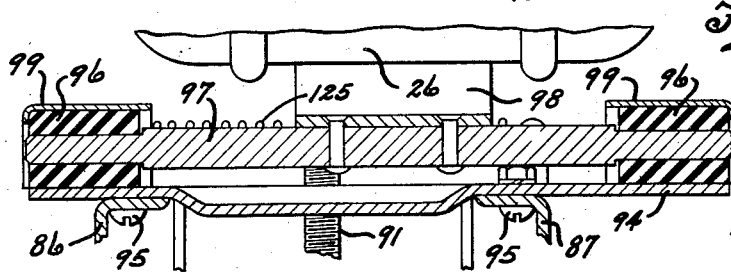
Fig. 7 is a sectional view on a larger scale taken on line 7—7 of Fig. 3.
Figure 8:
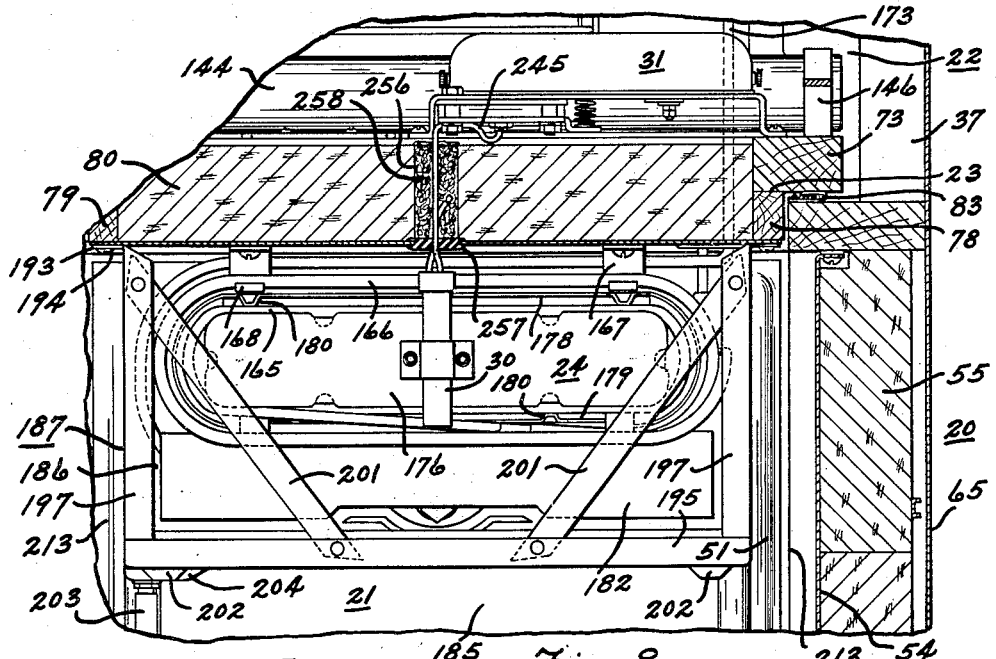
Fig. 8 is a rear view of the evaporator and a fragmentary sectional view of the cabinet, the section being taken on line 8—8 of Fig. 4.
Figure 9:
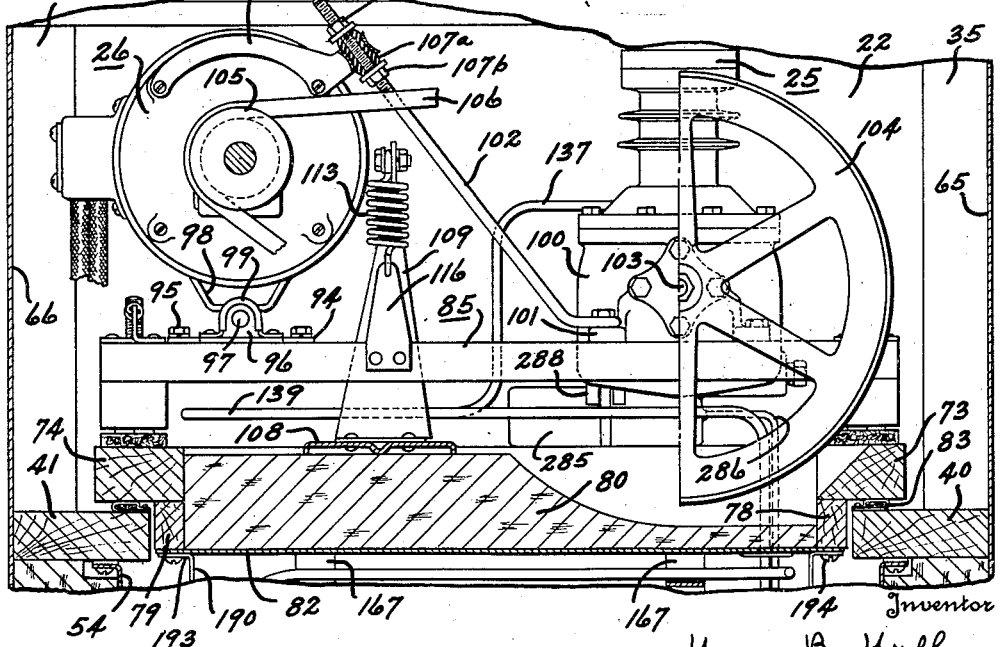
Fig. 9 is a sectional view taken on line 9—9 of Fig. 4.
Figure 10:
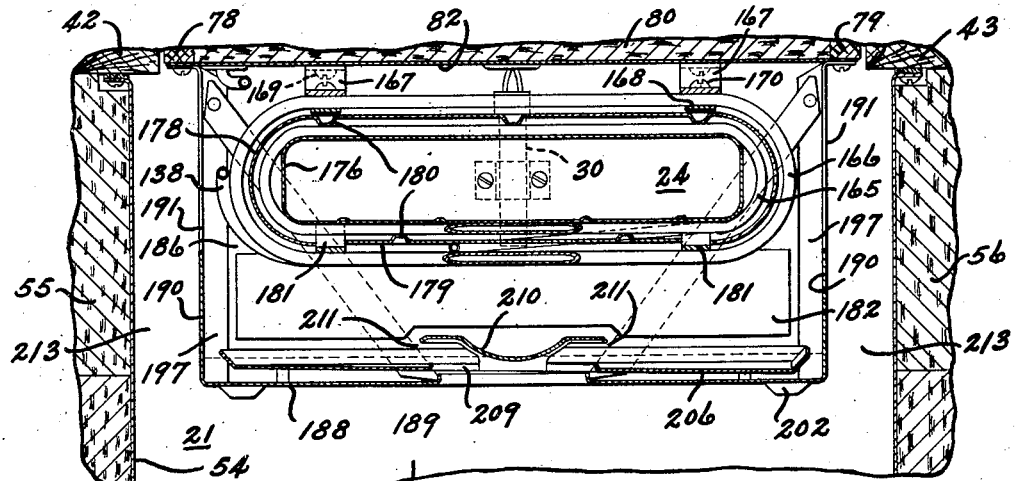
Fig. 10 is a sectional view taken on line 10—10 of Fig. 11.

Referring to the drawings, there is shown a cabinet 20 of box-like structure comprising a refrigerating compartment 21 and a machine compartment 22. These compartments are separated from one another by a wall 23. A cooling unit 24 is carried by and below the wall 23 and extends within the refrigerating compartment 21, and a compressor 25, driving motor 26, and condenser 27 are carried by and on the top of said wall 23. A fan 28 carried by the motor shaft is adapted to circulate air through the machine compartment 22 for cooling the condenser, the compressor, and the motor. A thermostat 30 is connected to the rear of the cooling unit 24 and is operatively connected with a switch 31 for starting and stopping the driving motor 26 in response to the temperature of the cooling unit 24 and compartment 21.

Figure 11:
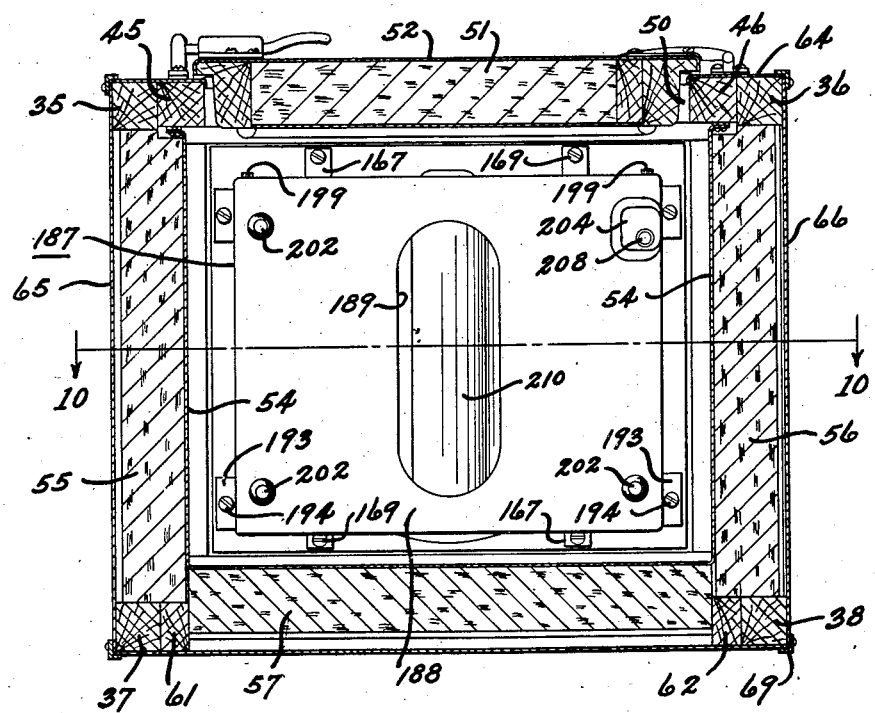
Fig. 11 is a sectional view taken on line 11—11 of Fig. 3.

Referring more in detail to the drawings, the cabinet 20 includes front posts 35 and 36 and rear posts 37 and 38. A frame comprising front rail 40, rear rail 41, side rails 42 and 43 are suitably secured to the front posts intermediate the top and bottom of said posts. A similar frame (not shown) is provided near the bottom of the cabinet. Rails 45 and 46 are secured respectively along the posts 35 and 36 and these rails co-operate with rail 40 to provide a door frame having a door opening 50. A door 51 is hinged to the rail 46 and the post 36 and is adapted to close said opening 50 and has a sheet metal sheath 52. An open-front and open-top metal lining 54 is suitably secured to the side rails 45 and 46 and to the top rails 40 and 43. Insulating material such as cork-board 55 is arranged between posts 35 and 37 and along one side of the lining 54. A similar cork-board 56 is arranged between posts 36 and 38 along the opposite side of the lining 54. The back of the lining is covered with cork-board 57, and it is to be understood that the bottom of said lining is also covered with cork-board. Posts 61 and 62 are secured to and arranged parallel with posts 37 and 38 (see Fig. 11). By arranging posts 61 and 62 as shown, rectangular shaped cork-board 57 without offset may be used. A sheet metal front 64 covers the front of the cabinet 20 and is coextensive with the machine compartment 22. Sheet metal sides 65 and 66 cover the entire sides of the cabinet 20 and a sheet metal back 67 covers the insulation 57 and extends only to the machine compartment 22, the back of said compartment being open. Angle strips 69 cover the adjoining edges of said sheet metal. The cabinet herein shown is substantially the same as that shown in my copending application, Ser. No. 147,862, filed November 12, 1926.

The refrigerating apparatus for cooling the compartment 21 is constructed as a sub-assembly which can be attached to and removed from the structure 20 as a unit. This assembly or unitary structure includes the partition wall 23, comprising a front rail 71, a rear rail 72 and side rails 73 and 74. A frame comprising the front rail 76, a rear rail 77 (see Fig. 4) and side rails 78 and 79 are carried respectively below rails 71, 72, 73 and 74. These frames constitute the removable base of the machine compartment 22. Insulating material such as cork-board 80 is carried within these frames. A sheet metal plate 82 is secured on the under side of rails 76 and 79. This plate forms the top wall of the compartment 21 and is utilized to assist in maintaining the cork-board 80 in position. Rails 71 and 74 rest respectively on rails 40 and 43, there being strips of soft insulating material such as a felt gasket 83 disposed between said rails to seal the joint.

The compressor 25 and the motor 26 are carried by a base 85. This base includes parallel extending angle irons 86 and 87 which are connected by cross bars or strips 88 and 89. These cross bars are formed in the shape of a U and the lower portions of each are bent upwardly as at 90. Portions 90 are perforated to receive bolts 91 and 92 respectively. A motor base plate 94 is suitably secured to angle irons 86 and 87 by bolts 95. This motor mounting includes rubber bushings 96 which receive a rod 97. A U-shaped bracket 98 is carried by the rod 97 and supports the motor 26 and the bushings 96 are maintained in position by retainers 99 which are secured to the plate 94. By virtue of this construction the rod 97 and likewise the motor 26 pivot about the bushings 95 and 96.

The compressor herein shown is substantially the same as that shown in my copending application, Serial No. 179,955, filed March 31, 1927. The crankcase 100 of the compressor 25 is provided with outwardly extending lugs 101 by which it is secured to the angle irons 86 and 87. These lugs are disposed adjacent the crankshaft 103 of the compressor so as to minimize vibration. The rear end of the motor 26 carries the fan 28 and a pulley 105 and the rear end of the compressor 25 carries a pulley 104; these pulleys are connected with a belt 106. A portion of the cork 80 and the rail 73 are cut away to provide clearance for the flywheel 104. One end of a brace 102 is secured to the crankcase of the compressor by a compressor mounting bolt and the other end thereof extends within a bushing of shock absorbing material such as rubber 107$^a$. This bushing is carried by a bracket 107 which is secured to the motor 26. Nuts 107$b$ on the threaded brace 102 and on opposite sides of the bushing 107$^a$ provide means for positioning the motor to adjust the belt tension and hold said motor in the adjusted position. The rubber bushing 107$^a$ absorbs vibrations and thereby prevents transmission of vibration from the motor to the base 55.

The base 85 and the apparatus carried thereby, including the motor and compressor, are suspended from a floating support at the center of oscillation of such apparatus. This support includes a metal plate 108 which is secured to rails 71 and 72. A bracket 109 (see Fig. 5) is secured to the plate by rivets 110. This bracket extends upwardly and is provided with outwardly extending arms 111 and 112. Springs 113 and 114 depend, respectively, from the arms 111 and 112 and the spring 113 is connected with the angle iron 86 by a short strip 116, while the spring 114 is connected with an ear 117 secured to the angle iron 87 by an adjustable bolt 115.

For various reasons, in the present case, the center of oscillation and the center of gravity of the apparatus are not coincident. Therefore, it is necessary to provide balancing means in order to prevent the apparatus from turning about the center of oscillation. In the present instance there is a greater mass on the compressor side of the center of oscillation than on the motor side, therefore, balancing means are necessary for upholding the compressor end. This balancing means is clearly shown in Fig. 4 in which the angle irons 86 and 87 carry upwardly extending ears 118. A sleeve 119 is adjustably carried by the upwardly extending bolt 92 and is provided with a slot which receives a spring clip 120. A spring 121 is connected with one end of the clip 120 and with one of the ears 118 and a similar spring is connected at the other end of the clip 120 and with the other ear 118. The upper end of the sleeve 119 extends a substantial distance above the connecting point of springs 121 with the ears 118, and by virtue of this construction the compressor end of the apparatus is suspended to a certain degree by the springs 121. Due to the fact that the springs are connected at a center point and extend laterally, thereby yieldingly limiting the lateral movement of the apparatus.

At the opposite end of the frame 85 additional means are provided for limiting the lateral movement of the apparatus. Springs 125 are connected with the posts 91 which are disposed intermediate the frames 86 and 87 and the other ends of these springs are connected with ears 127 which are carried respectively by angle irons 86 and 87.

At starting, due to the torque of the motor and due to the resistance offered by the compressor in moving same from a static position, the entire apparatus tends to swing about the floating support, and, in order to prevent the apparatus from striking soundly against the stationary parts, felt pads 130 and 131 are disposed below the brackets 88 and 89. Thus the impact is taken through said felt pads and in this manner the starting noises are minimized. In order to limit upward swinging movement of the apparatus during the starting operation, a bracket 132 is provided which carries felt strips 133 projecting above the angle irons 86 and 87 so that when the compressor end of the apparatus moves upwardly an abnormal amount, the movement of the angle irons 86 and 87 will be limited and the felt pads 133 absorb the shock. Bracket 132 is screw-threaded on to the bolt 92 and is adjustable so as to provide the desired clearance between the angle iron and said belt. Bolts 91 and 92 carry nuts 135 and 136 which can be turned downwardly upon the portions 90 of the U-shaped brackets 88 and 89 to force said brackets in engagement with the felt pads 130 and 131 for tightly locking the apparatus in position. In this manner the apparatus can be placed in stable position for shipment.

A suction pipe 137 is connected to the crankcase 100 by a coupling 138 and is provided with a large U-bend 139. The outlet end of the compressor 25 is connected with a shut-off valve 140, which in turn is connected with a pipe 141 and a U-shaped bend 142 connected with the condenser 27. These U-bends provide a yielding connection from the compressor to the receiver and evaporator. This condenser includes a plurality of elongated turns of pipe arranged transversely to the motor axis and disposed parallel with the motor fan 28 and provides a guard for the fan 28. The lower end of this condenser 27 is connected to a receiver 144 through a coupling 145. This receiver is secured to the rails 73 and 74 by clamps 146 and screws 147. The clamps 146 are provided with upwardly bent portions 148. Condenser spacing and supporting brackets 150 are provided with horizontally bent portions adapted to be interposed between the portions 148 of the brackets 146 and the receiver 144 for securing same in position. These brackets 150 extend on the outside of the ends of the condenser 27 and strips 152 are secured thereto by screws 151 on the inside of the condenser whereby to clamp the turns of the condenser in spaced relation with one another.

In operation, the fan 28 causes air to be circulated through the machine compartment 22, the air entering and passing out of the compartment through the open back of said compartment. Preferably, the air enters from the rear left side (as viewed in Fig. 2) and expels through the rear right side. Some of the circulating air will pass transversely over the left end of the loops of the condenser, then a portion of such air will pass over the condenser and then the motor, and then flow transversely over the opposite end of the loops whence it is expelled from the machine compartment. A large portion of circulating air will flow substantially parallel with the loops, from the left to the right side, without passing over the compressor or motor. Thus, air will flow across both ends of the condenser and sweep parallel with the middle portion.

By arranging the apparatus so that air can circulate through one wall, other than the front wall, warm air from the machine compartment will not enter the food compartment nor will cold air be withdrawn from the food compartment by the fan 28 when the door 51 is open and when the apparatus is in operation.

The switch 31 is carried by rails 72 and 73 and a fuse terminal block 154 (see Fig. 2) is secured to rails 72 and 74. The circuit to the motor includes a wire 155, a fuse 156, wire 157, switch 31, wire 158, motor 26, wire 159, fuse 160 and wire 161. The wires 158 and 159 are held in place by a clip 162 which is secured to the bracket 150 by screws 151.

The cooling unit 24 is herein shown as an evaporator including horizontally elongated superimposed coils 165 and 166. The upper end of the outer coil 166 is clamped between brackets 167 and strips 168. Bracket 167 is secured to the wall 23 by screws 169, and the strips 168 are secured to the bracket 167 by screws 170. The flow of refrigerant to the evaporator is controlled by an expansion valve 172, the inlet end of which is connected with the receiver 144 by a pipe 173 and a shut-off valve 174.

A closed-back sleve 176 is disposed within the inner coil 165 and is adapted to receive a plurality of ice trays 177. Means are provided for insulating the inner coil 165 and this means comprises a shield 178 which is interposed between the coils 165 and 166 adjacent the sides and top of coil 165 and this means also includes a shield 179 disposed below the coil 165 and between said coil and coil 166. The shields 178 and 179 can be made of a single sheet of material but can be more readily assembled when made as shown. The shields are provided with projecting portions 180 for spacing the major portion thereof from the coil 165. Spacers 180 are interposed between the coils 165 and 166 for holding the inner coil 165 in spaced relation with respect to coil 166. A plurality of fins 182 are thermally secured to the under side of the cooling unit 24. These fins are shown as attached at the bottom of coil 166 and extend parallel with the turns of said coil.

The refrigerating compartment 21 is divided into a food or storage compartment 185 and a cooling compartment 186 by a partition 187. Partition 187 includes a bottom wall 188 having a central opening 189, side walls 190 having openings 191 in their upper ends thereof. The side walls 190 are provided with outwardly extending flanges 193 which are secured to the wall 23 by screws 194. The bottom wall 180 is provided at the front and rear with upwardly extending flanges 195 and the side walls 190 are provided at the front and rear with inwardly extending flanges 196 and 197 respectively. A removable front 198 is secured to the flanges 196 by thumb screws 199. The lower end of the front 198 extends in back of the lower flange 195 for the purpose of conducting water, which may condense on the front wall, to the bottom wall 188. The front 198 is provided with an opening 200 in alignment with the ice trays 177 for the purpose of removing said ice trays through said front wall. The expansion valve 172 is disposed between the outer coil 166 and the bottom 188 and adjacent the front of the compartment. By removing the front 198, access may be had to the valve 172, in case adjustment is necessary. Braces 201 are secured to the bottom flange 195 and the rear flanges 197 to insure stability for the partition. Depressed portions 202 are provided in the bottom wall 188 of the partition 187. One of said depressed portions 204 provides a connection for a drain pipe 203. These depressed portions 202 form feet for the refrigerating apparatus.

Figure 12:
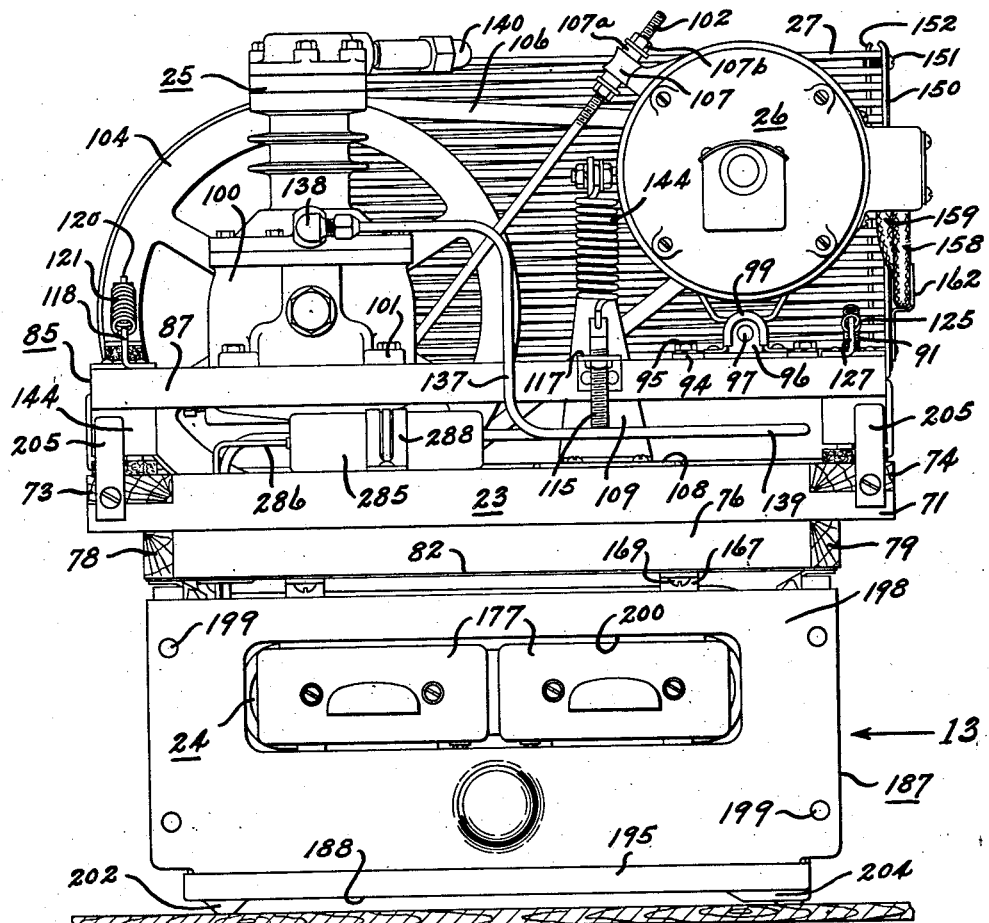
Fig. 12 is a front view of the refrigerating apparatus removed from the cabinet.
Figure 13:
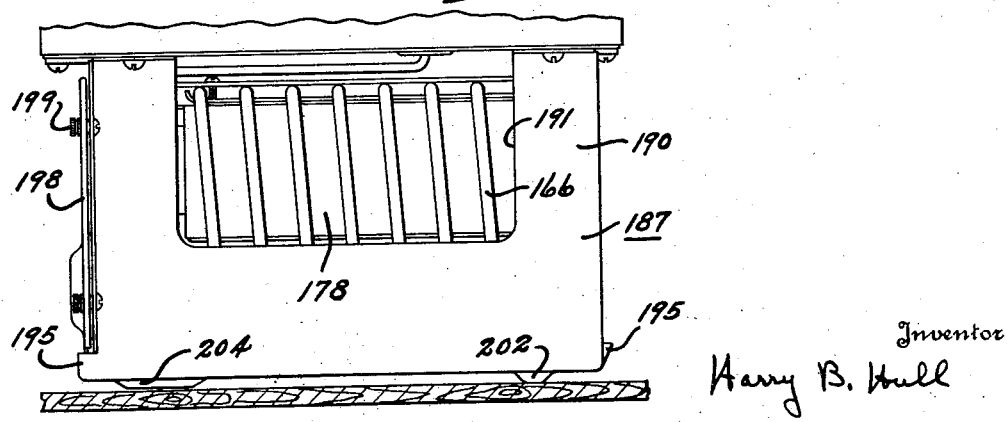
Fig. 13 is a fragmentary view looking in the direction of arrow 13 of Fig. 12.
Figure 14:
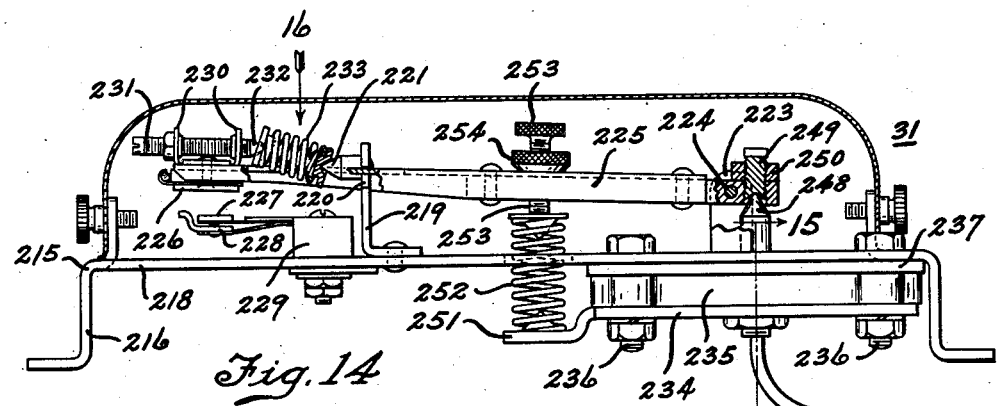
Fig. 14 is a side view of the controller used in the refrigerator showing parts thereof in section.
Figure 16:
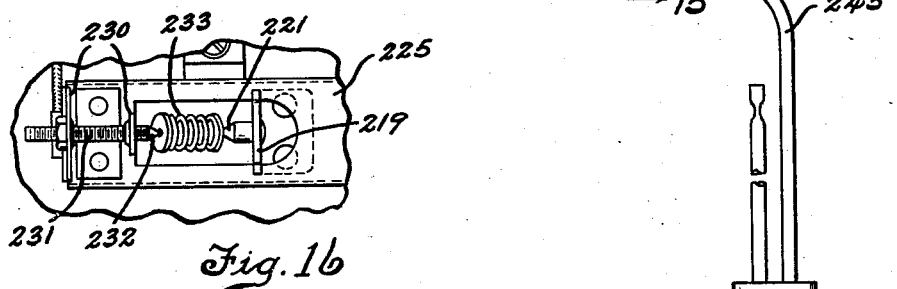
Fig. 16 is a view looking in the direction of arrow 16 of Fig. 14.
Figure 15:
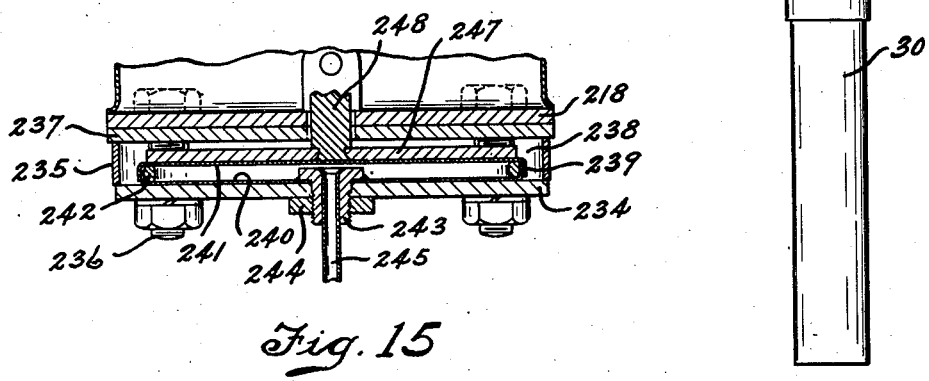
Fig. 15 is a sectional view taken on line 15—15 of Fig. 14.
Figure 18:
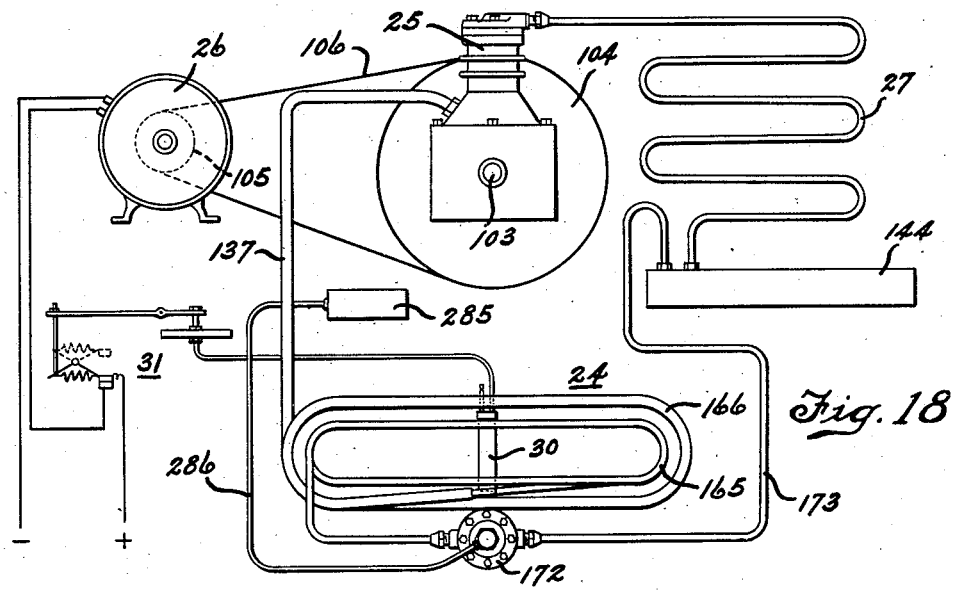
Fig. 18 is a diagrammatic view of the refrigerating system.

The entire refrigerator apparatus including the top wall 23 for the compartment 21 and the partition wall 187 comprising a unitary structure which can be assembled as such and then attached to the finished cabinet. Likewise the entire apparatus can be removed from the cabinet as a unit after the machine compartment cover 222 is removed. The partition wall 187, which divides the refrigerating compartment into a cooling compartment and a food compartment, provides a base for the refrigerating apparatus whereby the refrigerating apparatus may be placed in an upright position on the floor or on a platform as is clearly shown in Figs. 12 and 13. Handles 205 are secured at convenient places upon the base 23 for the purpose of lifting the apparatus for placing same into or to withdraw same from the cabinet.

A drip pan 206 is interposed between the cooling unit 24 and the bottom wall 188 of the partition and is spaced from said partition by spacer 207. This pan 206 slopes toward the drain pipe 203 and is perforated as at 208 for conducting water to the depression 204 in the bottom wall 188. Pan 206 is provided with an elongated opening 209 which is arranged in alignment with the opening 189 in the wall 188. The space between the wall 188 and the pan 206 provides a dead air pocket for insulating the wall 188 in order to prevent condensation on said latter wall. Condensed water which drips from the cooling unit 24 falls within the drip pan 206 and in order to prevent drippage through the openings 209 and 189 in said pan and wall 188 respectively, an elongated shield 210 is disposed above said openings and is spaced therefrom to provide air passages 211.

Relatively warm air from the storage compartment 185 passes upwardly through the side flues 213, formed by the side walls 190 of the partition and the cabinet lining 54, and enters through the openings 191 in the wall 190 and flows longitudinally over the fins 182 and through the passage 211 and openings 209 and 189 and through the storage compartment. The back of partition 187 is open and a portion of the air, passing from the cooling compartment 186 to the food compartment 187, will flow through said open back. Certain advantages are present in this type of construction, that in case articles are placed under the opening 189, the flow of air therethrough may be impeded. However, air can flow through the open back and then downwardly into the storage compartment.

The cooling unit 24, and particularly the inner coil 165, are disposed adjacent the top of the refrigerating compartment 21, and due to the inlet openings 191 leading to the cooling compartment 186, being relatively low, and due to the fact that the coils 166 are isolated from the remaining portion of the cooling unit 24, the relatively warm air will not strike the freezing coil 165. In this manner the cooling unit is provided with a freezing portion and an air cooling portion. Moreover, the refrigerant to the evaporator is directed from the expansion valve to the coil 165 and then to the coil 166. In this manner the coil 165 contains the coldest refrigerant. By constructing and arranging this cooling unit as herein disclosed, quick freezing or congealing of substances in the ice trays 177 is obtained, while at the same time the temperature of the air cooling portion of the cooling unit is not reduced to such a low temperature as to cause freezing of the foods within the food compartment.

Switch 31 comprises a base 215 including legs 216 which are secured to rails 72 and 73 by screws 217 and includes a raised platform 218. A bracket 219 is secured to the platform 218 and is provided with slots 220 and a fulcrum pin 221. Upwardly extending ears 223 disposed adjacent the other end of the platform 218 carries a fulcrum pin 224 for pivotally mounting a lever 225. One end of this lever carries a contact 226 which is arranged to engage a contact 227 and a non-arcing contact 228 which are resiliently carried by a post 229 secured to the platform 218. Said end of the lever 225 is also provided with upwardly extending ears 230 which are screw-threaded to receive an adjusting screw 231 having a fulcrum pin 232. A compression spring 233 is interposed between the pins 231 and 221 and is adapted to move quickly to quickly make and break the connection between contacts 226 and 227 when the fulcrum pins 232, 221, and 224 are brought in alignment.

A plate 234 is located below the platform 218 and is held in spaced relation therefrom by a spacing ring 235 and is secured thereto by bolts 236. A plate 237 is interposed between the ring 235 and the platform 218 in order to prevent buckling of the platform 218 when the bolts 236 are drawn. The spacing ring 235 and the plate 237 provide a chamber 238 which is arranged to receive a pressure responsive device 239. This device includes spaced flexible diaphragms 240 and 241 having telescoping flanges secured to one another as by soldering and are provided with a retaining ring 242. The lower diaphragm 240 is perforated to receive a coupling 243 which extends through the plate 234 and is held in position on said plate by a nut 244. The coupling 243 is also connected with a tube 245, which tube is connected with the thermo-responsive bulb 30. The upper diaphragm 241 carries a plate 247 which plate carries a pin 248 extending through the platform 218. The end of lever 225 receives a socket 249 threaded into lever 225 which socket receives the pin 248 and is held in position by a lock nut 250. A spring 252 extends through the platform 218 and is interposed between an ear 251, formed on plate 235, and a screw 253. This screw is threaded into the lever 225 and is held in position by a lock nut 254. Increased pressure within the bulb 30 causes the device 239 to expand, forcing the pin 248 upwardly and the contact 226 downwardly, and when the pressure within the bulb 30 and the device 239 attains a predetermined value, contact 226 will quickly engage contact 227 to complete the circuit to the motor. When the pressure within the bulb recedes, the spring 252 will force the lever 225 in a clockwise direction and as soon as the fulcrum 231 passes a dead center position with respect to fulcrum 221 and fulcrum 224, contact 226 will separate quickly from contact 227.

The switch 31 and the bulb 30 which constitute the controller for the refrigerating apparatus can be assembled as a unit, the bulb 30 being insertable through an opening 256 in the cork wall 80. The point at which the tube 245 passes through the plate 82 is sealed with a grommet 257 and the opening 256 may be filled with suitable insulating material such as kapok 258. The bulb 30 is placed in direct contact with the back wall of the ice tray sleeve 176 so as to be responsive to the substance within the ice trays as well as the general temperature within the cooling compartment. By virtue of placing the bulb 30 in contact with the ice tray sleeve, quick cooling of the substance in the ice trays 177 is obtained because as long as the substance in the tray is warm, it will tend to warm the bulb. Thus the refrigerating cycle is prolonged and, if the bulb temperature has been reduced to such a degree so as to stop the refrigerating cycle, the substance in the tray, if still relatively warm, will cause the bulb to be heated quicker than normal to again start the refrigerating cycle.

Figure 17:
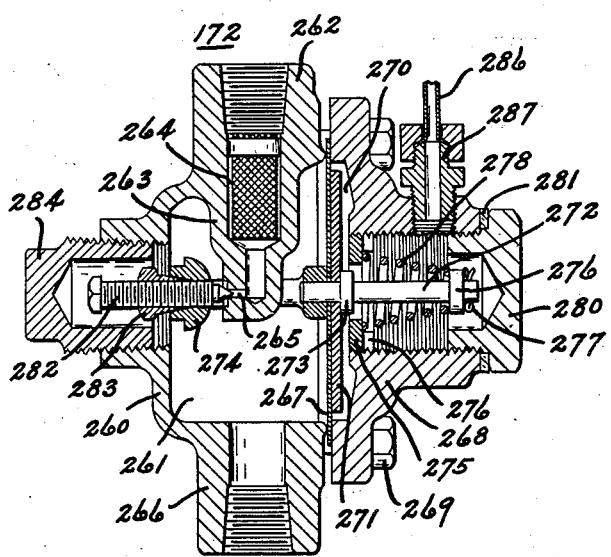
Fig. 17 is a longitudinal sectional view of the expansion valve used in the system.

Referring to Fig. 17, the expansion valve 172 includes a main body 260 providing a chamber 261. Body 261 is provided with aligned outwardly and inwardly extending bosses 262 and 263. Pipe 173 leading from the receiver 144 is connected with the boss 262. These bosses provide a passage 264 and boss 263 provides a relatively small transverse passage 265 connected with passage 264. Opposite the boss 262 is a hollow boss 266 leading from the chamber 261 and at which the inner coil 165 of the evaporator 24 is connected. One side of the body 260 is open and is provided with a flexible wall herein shown as a diaphragm 267. This wall is held in place by a cover plate 268 which is secured to the body 260 by bolts 269. Plate 268 is secured as at 270 to receive a diaphragm protecting plate 271. A rod 272 extends through the plate 271 and diaphragm 267 and is provided with a shoulder partition 273. A yoke member 274 is carried by the diaphragm 267 within the chamber 261, the diaphragm and plate 271 being securely clamped between the yoke and the shoulder portion 272. The cover plate 268 is provided with a threaded opening which receives an adjustable ring 275 having a slot for receiving a turning tool whereby to move the ring inwardly or outwardly. The outer end of the rod 272 carries a collar 276 held in place by a cotter pin 277. A spring 278 is interposed between ring 275 and collar 276 and the tension thereof may be varied by movement of the ring 275. A plug 280 closes the end of the hollow plate and gasket 281 prevents leakage at this joint.

Yoke 274 surrounds the end of boss 263 and is threaded to receive a needle valve 282. The outer end of the threaded opening in yoke 274 is tapered to receive a split lock nut 283 which is threaded onto valve 282. A plug 284 in the body 260 can be removed to provide access to the valve 282 and lock nut 283 for the purpose of adjusting said valve with respect to its seat. Valve 282 controls the flow of refrigerant from the passage 264 to the chamber 261.

The diaphragm 267 is subjected on one side to the pressure within the chamber 261 and on the other or back side to the pressure within the cover plate 268. Therefore, when the pressure in the chamber attains a certain low value, the valve 282 will be moved from its seat to admit more refrigerant to the chamber 261 and likewise to the evaporator 24. Conversely, when the pressure in the chamber attains a certain high value, the valve 282 will close to shut off the flow of refrigerant to the evaporator. Thus it is apparent that, during the operation of the system, valve 270 normally tends to maintain a constant pressure within the evaporator 24.

It is desirable to maintain the back side of the diaphragm covered to prevent moist air from circulating adjacent said diaphragm. If air were permitted to circulate in back of the diaphragm, a frost would collect thereon and this frost would materially affect the operation of the valve. Merely sealing the back of the diaphragm will not entirely remove defects, due to changes in operation of the valve, because the air in back of the diaphragm will be chilled and, due to the back side being sealed, the pressure on the back side will decrease. Hence under certain conditions, for example, at the start of the refrigerating cycle, when the valve is relatively warm, relatively high pressure is present in back of the diaphragm, and, after the refrigerating cycle has continued for a while, the valve will be colder and a lower pressure is present in back of the diaphragm. These changes in pressure often cause a decrease in efficiency of operation.

In order to cause the valve 172 to function more correctly under varying conditions, a governing device has been provided for controlling the pressure in the back of the diaphragm. This device is herein shown as comprising a fluid bulb 285 which is connected to the back side of the diaphragm by a tube 286 and a coupling 287. This bulb is disposed outside the zone of direct cooling influence of the evaporator and is herein shown located within the machine compartment 22 and held in place by a bracket 288, the tube 286 extending through the top cork board 80. By applying the bulb, not only the air in back of the diaphragm, but also the air in the bulb and tube 286 must be chilled before the pressure on the back side of the diaphragm will be decreased. And, it is readily apparent that any desired pressure may be obtained in back of the diaphragm. For example, the bulb may be placed in such location within the machine compartment so that the temperature of the fluid within the bulb will be increased artificially and it may be filled with a volatile fluid. For practical purposes it has been found desirable to maintain air in the bulb and to carry same as shown in which the bulb is subjected to environment temperature within the machine compartment 22, which temperature will be ordinarily a little higher than room temperature.

From the foregoing it can be seen that the refrigerating system will operate at a higher back pressure in warm weather or in a warm room than in relatively cold weather or room, because a higher pressure will be maintained in back of the diaphragm in the warm environment. This feature of the invention is meritorious in that a relatively high back pressure is desirable in warm weather and a lower back pressure is desirable in colder weather; since, as well understood, higher efficiency is attainable with a relatively high back pressure and such higher efficiency is most desirable in warmer temperatures because of greater heat leakage through the cabinet walls. If a refrigerating apparatus is operated at a relatively high back pressure in colder weather, the temperature of the cooling unit is reduced quickly because the heat leakage through the cabinet is relatively small. Therefore, the period for freezing is relatively small. Moreover, the refrigerating phases do not take place as frequently in cold weather as in warm weather because there is less heat leakage through the cabinet, consequently, the water will not be frozen as quickly in colder weather. Therefore, it is desirable to prolong the refrigerating phase in colder weather and this can be accomplished by reducing the back pressure in the system. The governing device herein shown regulates the back pressure automatically to produce the desired results, because, as the environment temperature falls, the pressure within the bulb 285 decreases and less force is applied to the back side of the diaphragm. Therefore, a lower pressure must be produced in the evaporator and in the expansion valve chamber 261 before the valve 282 opens.

Thus it is apparent that the governing device herein shown causes the system to function properly under different climatical conditions, in that after the valve is once adjusted, it will automatically maintain the desired back pressure for efficient operation in warm weather and provides for quickly freezing or congealing substances in colder weather. By virtue of providing a device which will automatically maintain a correct back pressure in the system regardless of environment temperature changes, the adjustment made by the manufacturer will be suitable whether the refrigerator is shipped to a warmer or colder climate or whether the refrigerator is placed in a cold room or a warm room.

It is apparent from the foregoing that I have provided a refrigerator the main advantages of which may be stated are low manufacturing costs, efficient operation, and quick freezing. The refrigerating apparatus including the partition 187 can be manufactured as a subassembly and shipped separate from the finished cabinet and then readily installed therein. Quick freezing is insured while desired temperatures are maintained for cooling the storage compartment, the cooling unit being constructed and arranged to provide a cooling portion and a freezing portion in which the latter portion is insulated as well as isolated from the circulating air, and the governing device for the expansion valve providing for quick freezing in cold environment while maintaining high efficiency in warm environment.

While the form of embodiment of the invention as herein disclosed, constitutes a preferred form, it is to be understood that other forms might be adopted, all coming within the scope of the claims which follow.

What is claimed is as follows:

1. A household cabinet, comprising in combination with a cabinet having a door opening in one side thereof and an opening in the top wall; of a removable cover for said latter opening; a cooling unit within the cabinet; and a partition wall separating said cabinet into a food compartment and a compartment containing said unit, said wall being spaced from the cooling unit and providing for the flow of air about the cooling unit for cooling the air passing through said compartment, said partition wall being removable bodily through said latter opening.

2. A household cabinet, comprising in combination with a cabinet having an opening in the top wall thereof; of a removable cover for said opening; a cooling unit within the cabinet; and a partition wall separating said cabinet into a food compartment and a compartment containing said unit, said wall being spaced from the cooling unit and providing for the flow of air about the cooling unit for cooling the air passing through said compartment, said partition wall depending from the cover and removable from the cabinet with the cover.

3. A household refrigerator, comprising in combination with a cabinet having an opening in one wall thereof; of a removable cover for said opening; a cooling unit within the cabinet; and a partition wall separating said cabinet into a food compartment and a compartment containing said unit, said partition wall including portions extending along the bottom and along one side of the cooling unit and providing passages for the circulation of air between said compartments, said wall being spaced from the cooling unit and providing for the flow of air about the cooling unit for cooling the air passing through said compartment, said partition wall being removable bodily through said opening.

4. A household refrigerator, comprising in combination with a cabinet having an opening in one wall thereof; of a removable cover for said opening; a cooling unit within the cabinet; and a partition wall separating said cabinet into a food compartment and a compartment containing said unit, said partition wall including portions extending along the bottom and on opposite sides of the cooling unit and providing passages for the circulation of air between said compartments, said wall being spaced from the cooling unit and providing for the flow of air about the cooling unit for cooling the air passing through said compartment, said partition wall being removable bodily through said opening.

5. A household refrigerator, comprising in combination with a cabinet having an opening in one wall thereof; and a unitary structure including a cover for said opening; a cooling unit within the cabinet on one side of said cover, means on a different side of said cover for circulating refrigerating medium through said unit, and a partition wall separating said cabinet into a food compartment and a compartment containing said unit, said wall being spaced from the cooling unit and providing for the flow of air about the cooling unit for cooling the air passing through said compartment.

6. A household refrigerator, comprising in combination with a cabinet having an opening in the top wall thereof; and a unitary structure including a cover for said opening, a cooling unit within the cabinet below said cover, means carried on the top side of said cover for circulating refrigerating medium through said unit, and a partition wall carried by said cover and separating said cabinet into a food compartment and a compartment containing said unit, said wall being spaced from the cooling unit and providing for the flow of air about the cooling unit for cooling the air passing through said compartment.

7. A household refrigerator, comprising in combination with a cabinet having an opening in the top wall thereof; and a unitary structure including a cover for said opening, a cooling unit carried by the cover on the under side thereof, means carried on top of said cover for circulating refrigerating medium through said unit, and a partition wall separating said cabinet into a food compartment and a compartment containing said unit, said wall being spaced from the cooling unit and providing for the flow of air about the cooling unit for cooling the air passing through said compartment.

8. A refrigerating apparatus comprising in combination, a cabinet, a cooling unit within the cabinet; means for circulating a refrigerating medium through said unit; and a wall enclosing a portion of said cooling unit and arranged to divide said cabinet into a food compartment and a compartment containing said unit, said wall being spaced from the cooling unit and providing for the flow of air about the cooling unit for cooling the air passing through said compartment, said wall providing a base for said refrigerating apparatus when removed from the cabinet.

9. A refrigerating apparatus comprising in combination, a cabinet having an opening, a cover for closing the opening in the cabinet; a cooling unit disposed on one side of said cover; means disposed on the other side of said cover for circulating a refrigerating medium through said unit; and a wall enclosing a portion of said cooling unit and arranged to divide said cabinet into a food compartment and a compartment containing said unit, said wall being spaced from the cooling unit providing for the flow of air about the cooling unit for cooling the air passing through said compartments, said wall providing a base for said refrigerating apparatus when removed from the cabinet.

10. A refrigerating apparatus comprising in combination, a cabinet having an opening, a cover for the opening in said cabinet; a cooling unit disposed below said cover; means disposed above said cover for circulating a refrigerating medium through the cooling unit; and a wall enclosing a portion of said cooling unit and arranged to divide said cabinet into a food compartment and a compartment containing said unit, said wall being spaced from the cooling unit providing for the flow of air about the cooling unit for cooling the air passing through said compartments, said wall providing a base for said refrigerating apparatus when removed from the cabinet.

11. A refrigerator, comprising in combination, a cabinet, a cooling unit within the cabinet including a container for refrigerating medium and fins thermally connected with and extending below said container, and means for directing the circulation of air to be chilled along the under side of the container and in contact with the fins.

12. A refrigerator, comprising in combination, a cabinet, a cooling unit including a horizontally elongated container for refrigerating medium disposed within the cabinet relatively close to the top thereof, a plurality of horizontally elongated fins thermally connected with and disposed below the container, and means for directing the circulation of air to be chilled along the under side of the container and along the fins.

13. A refrigerator, comprising in combination, a cabinet, a cooling unit within the cabinet including a container for refrigerating medium and a plurality of fins thermally connected with and disposed below the container; and an enclosure for a portion of the cooling unit constructed and arranged to provide for the admission of relatively warm air to the cooling unit adjacent a side of the container, and for directing the air along the under side of the container and in contact with the fins, and for the egress of air below the container.

14. A refrigerator, comprising in combination, a cabinet, a cooling unit within the cabinet including a container for refrigerating medium and a plurality of fins thermally connected with and disposed below the container, and an enclosure for a portion of the cooling unit constructed and arranged to provide for the admission of relatively warm air to the cooling unit through the opposite sides of the enclosure, and for directing the air along the under side of the container in contact with the fins, and for the egress of air through the bottom of the enclosure intermediate its ends.

15. A refrigerator, comprising in combination, a cabinet, a container for refrigerating medium disposed within and adjacent the top of the cabinet, a partition wall spaced a substantial distance below the container, a heat absorbing fin thermally connected with said container and disposed between said container and partition wall, and a valve for controlling the flow of refrigerant through the container interposed between the container and said wall.

16. A cooling unit comprising a freezing coil, a cooling coil spaced from the freezing coil, and a heat absorbing fin connected only with the cooling coil.

17. A cooling unit comprising a plurality of coils, one surrounding another, an insulating wall between said coils to provide an inner freezing portion and an outer cooling portion, and a heat absorbing fin thermally connected with the outer coil.

18. A refrigerator comprising in combination, a cabinet, a cooling unit carried adjacent the top of the cabinet, a partition wall below said cooling unit, said cooling unit being constructed and arranged to provide an upper freezing portion and an air cooling portion between the freezing portion and the partition wall, fins connected to the cooling unit and disposed between the freezing portion and the partition wall, and means for directing the circulation of air to be chilled in contact with said fins.

19. A refrigerator comprising in combination, a cabinet having a opening in one wall thereof and a unitary structure including a wall portion adapted to cover said opening, a refrigerating apparatus carried by the wall portion, said refrigerating apparatus including a cooling unit and means for circulating refrigerant through said unit, and a partition wall forming a part of said unitary structure, said wall being spaced from the cooling unit providing for the flow of air about the cooling unit for cooling the air passing through said compartment, and providing a base for said structure when the structure is removed from the cabinet.

20. Refrigerating apparatus, comprising in combination, an evaporator, means for withdrawing refrigerating medium from the evaporator and for compressing the same, a condenser operatively connected with said means, a receiver operatively connected with the condenser and evaporator, a support for the receiver, and common means for clamping the receiver to the support and the condenser on the receiver.

21. In combination, a chamber to be refrigerated, an evaporator within the chamber and adapted to cool said chamber, means for circulating refrigerant through said evaporator, a valve responsive to the pressure of the refrigerant in the evaporator for controlling the flow thereof to the evaporator, and means responsive to the temperature conditions outside the chamber for influencing the cooling action of said coil.

22. A refrigerating apparatus, comprising in combination, a chamber to be cooled, an evaporator within the chamber and adapted to cool said chamber, a valve responsive to the pressure within the evaporator for controlling the flow of refrigerant to said evaporator, and means responsive to temperature conditions outside the chamber, said last means tending to oppose changes in valve operation resulting from variation in the temperature of the evaporator.

23. A refrigerating apparatus, comprising in combination, a chamber to be cooled, an evaporator within the chamber and adapted to cool said chamber, a valve responsive to the pressure within the evaporator for controlling the flow of refrigerant to said evaporator, and means responsive to the temperature conditions outside of the chamber, said last means tending to oppose changes in valve operation resulting from variation in temperature within the chamber.

24. A refrigerating apparatus, comprising in combination, a chamber to be refrigerated, an evaporator within said chamber and adapted to cool said chamber, means for circulating refrigerant through said evaporator, a valve responsive to the pressure within the evaporator for controlling the flow of refrigerant to said evaporator, said valve including a flexible wall, one side of which is subjected to the pressure within the evaporator, and pressure responsive means acting on the other side of said flexible wall and responsive to the temperature conditions outside the chamber, said last means tending to oppose changes in valve operation resulting from variation in the temperature of the evaporator.

25. A refrigerating apparatus, comprising in combination, a chamber to be refrigerated, an evaporator within said chamber and adapted to cool said chamber, means for circulating refrigerant through said evaporator, a valve responsive to the pressure within the evaporator for controlling the flow of refrigerant to said evaporator, said valve including a flexible wall, one side of which is subjected to the pressure within the evaporator, and pressure responsive means acting on the opposite side of said flexible wall and responsive to the temperature conditions outside of said chamber, said last means tending to oppose changes in valve operation resulting from variation in the temperature of the chamber.

26. A refrigerating apparatus, comprising in combination, a chamber to be refrigerated, an evaporator within said chamber and adapted to cool said chamber, means for circulating refrigerant through said evaporator, a valve responsive to the pressure within the evaporator for controlling the flow of refrigerant to said evaporator, said valve including a flexible wall, one side of which is subjected to the pressure within the evaporator, and a fluid containing device operatively connected with the opposite side of said flexible wall and responsive to the temperature conditions outside the chamber, said device tending to oppose changes in valve operation resulting from variation in the temperature of the evaporator.

27. The method of regulating the expansion of a refrigerant within an evaporator, which consists in expanding the refrigerant in response to the environment cooled by the evaporator and in response to temperature outside the chamber cooled by the refrigerant.

28. The method of regulating the expansion of a refrigerant within an evaporator which consists in expanding the refrigerant in response to the condition of the refrigerant in the evaporator and in response to temperature outside the chamber cooled by the evaporator.

29. The method of regulating the expansion of a refrigerant within an evaporator which consists in expanding the refrigerant in response to the pressure of the refrigerant in the evaporator and in response to temperature outside the chamber cooled by the evaporator.

30. The method of regulating the expansion of a refrigerant within an evaporator, which consists in expanding the refrigerant in response to the environment cooled by the evaporator and in response to an enclosed fluid which is subjected to temperature outside the chamber cooled by the refrigerant.

31. The method of regulating the expansion of a refrigerant within an evaporator which consists in expanding the refrigerant in response to the condition of the refrigerant in the evaporator and in response to an enclosed fluid which is subjected to temperature outside the chamber cooled by the evaporator.

32. The method of regulating the expansion of a refrigerant within an evaporator which consists in expanding the refrigerant in response to the pressure of the refrigerant in the evaporator and in response to an enclosed fluid which is subjected to conditions outside the chamber cooled by the evaporator.

33. A cooling unit comprising a set of elongated refrigerant-conducting-freezing-loops, a set of elongated refrigerant-conducting-cooling loops spaced from and surrounding said freezing-loops, and a heat absorbing fin connected only with the cooling loops.

34. In combination, a box-like structure having a food compartment and a machine compartment, the front wall of said compartments being common to both compartments fixed and having a door opening for the food compartment, said machine compartment being open in the back; a refrigerator condenser within the machine compartment; and means within the machine compartment for circulating air through said opening and about said condenser.

In testimony whereof I hereto affix my signature.

HARRY B. HULL.